United States Patent
Louis

(10) Patent No.: US 8,602,188 B2
(45) Date of Patent: Dec. 10, 2013

(54) HIGH RESOLUTION ONE-WAY CLUTCH WITH GRADUATED SAW-TOOTH ENGAGEMENT FOR AN AUTOMATIC SLACK ADJUSTER

(75) Inventor: John M Louis, Elyria, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 496 days.

(21) Appl. No.: 12/858,638

(22) Filed: Aug. 18, 2010

(65) Prior Publication Data
US 2012/0043175 A1 Feb. 23, 2012

(51) Int. Cl.
F16D 11/00 (2006.01)

(52) U.S. Cl.
USPC .......................................................... 192/46

(58) Field of Classification Search
USPC ................................ 192/46, 69.81, 69.62, 108
See application file for complete search history.

(56) References Cited

U.S. PATENT DOCUMENTS

| | | | |
|---|---|---|---|
| 2,916,936 A | 12/1959 | Neracher et al. | |
| 3,508,450 A | 4/1970 | Richards | |
| 3,820,635 A | 6/1974 | Hurt | |
| 3,999,636 A | 12/1976 | Schumacher | |
| 4,380,276 A | 4/1983 | Sweet et al. | |
| 4,621,714 A | 11/1986 | Skurka | |
| 7,100,756 B2 * | 9/2006 | Kimes et al. | 192/46 |
| 7,743,678 B2 * | 6/2010 | Wittkopp et al. | 74/339 |
| 2006/0237276 A1 | 10/2006 | Jegatheeson | |
| 2006/0278487 A1 * | 12/2006 | Pawley et al. | 192/43.1 |
| 2009/0266667 A1 * | 10/2009 | Samie et al. | 192/43.1 |
| 2010/0018812 A1 | 1/2010 | Louis | |

FOREIGN PATENT DOCUMENTS

WO WO 2005/098259 A1 10/2005

OTHER PUBLICATIONS

Bendix ASA-5 Automatic slack adjuster SD-05-1269 "Service Data Sheet" pp. 1-12.
International Search Report dated Jan. 5, 2012 (Two (2) pages).
PCT/ISA/220 and PCT/ISA/237 (Seven (7) pages).

* cited by examiner

*Primary Examiner* — David D Le
*Assistant Examiner* — David J Hlavka
(74) *Attorney, Agent, or Firm* — Crowell & Moring LLP

(57) ABSTRACT

An automatic slack adjuster one-way clutch includes a first part, which is rotatable about an axis in both a drive direction and a slip direction opposite to the drive direction, and a second part, which is driven about the axis by the first part only when the first part rotates in the drive direction. The second part is not driven by the first part when the first part rotates in the slip direction. Multiple movable teeth, carried by one of the parts, are displaceable axially relative to both of the parts and engage between teeth immovably fixed on the other of the parts. The first part may be either an input part or an output part of the clutch.

20 Claims, 2 Drawing Sheets

HIGH RESOLUTION ONE-WAY CLUTCH WITH GRADUATED SAW-TOOTH ENGAGEMENT FOR AN AUTOMATIC SLACK ADJUSTER

BACKGROUND OF THE INVENTION

1. Field of the Invention

The present invention relates to automatic slack adjuster arrangements for vehicle brakes and, more generally, to any sort of arrangement that requires the use of a saw-tooth clutch having a high resolution. By way of the invention, problems relating to a stabilized stroke value being too large in an automatic slack adjuster using a saw-toothed one-way clutch are addressed.

2. Description of Related Art

Saw-toothed one-way clutches are often used in automatic slack adjusters. During one part of a braking cycle, i.e. during brake application or brake return, an input side of such a one-way clutch slips past an output side by an angle proportional to the increase in stroke due to brake wear. During the other part of the cycle, the input side of the one-way clutch engages with teeth at the output side to drive the one-way clutch output side. The output side of the one-way clutch turns a worm-shaft, which turns a worm gear coupled to a shaft of the brake cam shaft to compensate for lining wear.

Conventional devices typically have fixed teeth on the input and output sides and hence resolution is limited by the number of teeth that can be incorporated into mating clutch parts. Some automatic slack adjusters, of course, use wrap spring clutches, which employ close wound helical springs made from wire with a square cross-section. These clutches are stepless, which means they deliver outputs in response to very small inputs. A saw-toothed one-way clutch, by contrast, will deliver an output only when an input is large enough to move the one-way clutch input side to engage with the next tooth or set of teeth of the one-way clutch output side. Accordingly, in a saw-toothed one-way clutch, tooth spacing angle determines the resolution. Conventionally, 72 teeth are used, which results in a resolution of 5 degrees. While an improved clutch with 90 teeth resulting in 4° resolution has been developed, a higher number of teeth appears impractical as far as ease of manufacture and tooth reliability are concerned.

U.S. Pat. No. 2,916,936 to Neracher, et al. discloses a transmission system with a synchronous blocker clutch having slidably engaging teeth. The engagement mechanism permits a certain amount of torque to be maintained from the engine to the transmission when shifting to provide a step up ratio. A blocker piece prevents the teeth from engaging until synchronization occurs.

U.S. Pat. No. 3,508,450 to Richards concerns a manual transmission with spring engaged forks used to decouple the input and output. The spring engaged forks allow slipping in case of torque mismatch.

U.S. Pat. No. 3,820,635 to Hurt relates to a mechanical actuator for a disc brake caliper. A ball and ramp arrangement is used to move a piston with teeth on one end into engagement with receiving portion teeth on the brake portion.

U.S. Pat. No. 4,380,276 to Sweet, et al. discloses a vehicle brake slack adjuster having saw-teeth of a drive ratchet engagable with saw-teeth of a coupling.

U.S. Pat. No. 4,621,714 to Skurka concerns a slack adjuster with a pair of clutch mechanisms that have cooperating teeth. The receiving portion has teeth spaced radially inward in order to provide finer increments of adjustment during application and release.

U.S. Patent Application Publication 2010/0018812 A1 to Louis relates to a slack adjuster with a one-way clutch having movable pawls. The arrangement of the clutch within the body allows for a clutch with a larger number of teeth and thereby finer adjustment.

International Publication WO 2005/098259 A1 to Echambadi, et al. discloses an automatic brake adjuster including a serrated worm shaft portion movable into and out of engagement with a one way lock/clutch seat serration for clutch regulation.

SUMMARY OF THE INVENTION

One object of the invention is to increase the resolution of a saw-toothed one-way clutch so that its operation approximates a stepless operation as closely as possible. To improve the clutch resolution in this way, a new one-way clutch design having independently spring loaded teeth is proposed. The teeth are not acted upon by a third mechanism; instead, the teeth are configured as spring-engaged teeth on a clutch mechanism to provide finer resolution during brake application and release. In contrast to fixed teeth clutches conventionally used in lining wear compensation arrangements, the high-resolution clutch of the present invention uses independently movable teeth on one of a mating set of clutch mechanisms to provide finer adjustment increments. In one arrangement according to the invention, a slack adjuster one-way clutch has independently spring loaded movable teeth on the output portion, while the input portion has fixed teeth engaged by the movable output teeth. Unmatched numbers of teeth are used on the two parts of the saw-tooth clutch, and the movable teeth are independently engageable so as to provide improved resolution during brake application and release.

In preferred embodiments, the automatic slack adjuster one-way clutch includes a first part rotatable about an axis in both a drive direction and a slip direction opposite to the drive direction, and a second part that is driven about the axis by the first part only when the first part rotates in the drive direction. The second part, in other words, is not driven by the first part when the first part rotates in the slip direction. Multiple movable teeth, carried by one of the parts, are displaceable axially relative to both of the parts and engage between teeth immovably fixed on the other of the parts. The first part may be either an input part or an output part of the clutch.

The movable teeth, in a preferred configuration, are displaceable within bores distributed circumferentially about an end of the one of the parts, and the movable teeth are biased to protrude from the bores into engagement between the teeth immovably fixed on the other of the parts. In a selected clutch engagement state, some of the movable teeth have tips fully received in recesses between the teeth immovably fixed on the other of the parts, while the rest of the movable teeth have tips that are not fully received in the recesses. The teeth are biased in the manner referred to by way of resilient elements disposed in the bores.

In one particular embodiment, thirty six of the immovably fixed teeth are provided and twenty of the movable teeth are provided. This arrangement is effective to produce a resolution or adjustment increment of 2°.

DETAILED DESCRIPTION OF THE INVENTION

One environment in which a high resolution, one-way clutch according to the invention should find a particularly advantageous application is in a slack adjuster such as that forming the subject matter of U.S. Pat. No. 4,380,276 to Sweet, et al., which is mentioned above. Appropriate use of the present invention could result in improved cooperation between the drive and the coupling that, together, serve to impart rotational movement to the worm shaft used to drive the worm gear of the Sweet, et al. slack adjuster. The entire disclosure of the Sweet, et al. ('276) patent is incorporated herein by reference as non-essential subject matter.

Figure 1:
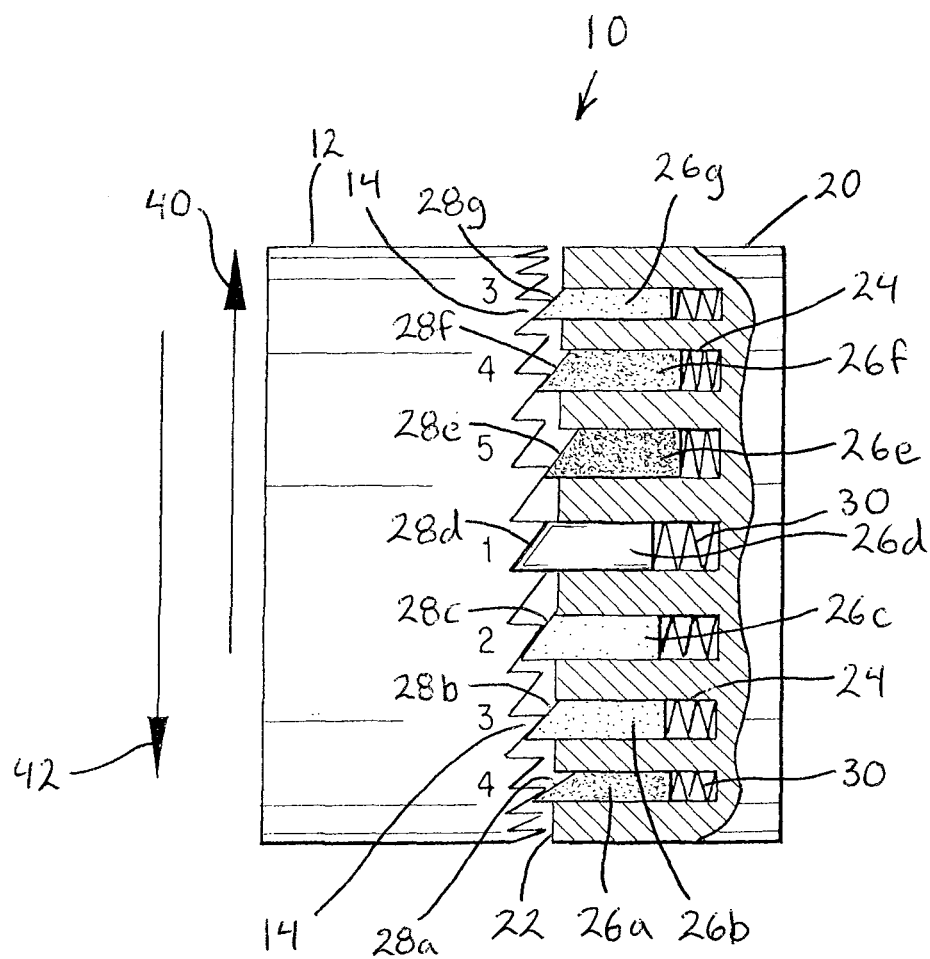
FIG. 1 is a lateral schematic view, partly in section, of a one-way clutch according to the present invention.

The one-way clutch 10 schematically shown in FIG. 1 includes a drive or input part 12. The input part 12, in the arrangement shown, has a cylindrical structure with a band of integrally formed or rigidly secured saw teeth 14 extending circumferentially around one axial end of the input part. As illustrated, the saw teeth 14 are integrally formed with the input part 12 at its axial end, but the teeth 14 could alternatively be rigidly secured to the remainder of the input part if such a construction is considered expedient. In any event, the saw teeth 14 are immovable relative to the remainder of the input part 12.

The one-way clutch 10 also includes a driven or output part 20. The output part 20, in the arrangement shown, also has a cylindrical structure, with an axial end 22 of the output part oriented to face the saw teeth 14 of the input part 12. A plurality of axially oriented bores 24 extend into the output part 20. The bores 24 are distributed circumferentially about the axial end 22 of the output part 20 at regular intervals. A sliding saw tooth 26a, 26b, . . . 26t is disposed for reciprocation within each of the bores 24, with a respective inclined end face 28a, 28b, . . . 28t of each tooth 26a, 26b, . . . 26t protruding at times beyond the axial end 22. A suitable coil, leaf, volute, elastomeric, or equivalent resilient spring element 30 is disposed between a bottom end of each bore 24 and an underside of a respective sliding saw tooth 26a, 26b, . . . 26t to bias the tip of each tooth into engagement within a corresponding recess defined between adjacent saw teeth 14. A driving direction 40 and a slip direction 42 are also indicated in FIG. 1. As will be understood, the input part 12 is rotatable about a central axis alternatively in the driving direction 40 and the slip direction 42, while the output part 20 is driven by the input part 12 only when the input part rotates in the driving direction 40.

In one preferred embodiment of the invention, the input part 12 of the clutch 10 is provided with thirty six of the fixed teeth 14, which results in tooth spacing of 10° around the circumference of the input part end. The output part 20, by contrast, is provided with twenty of the sliding saw teeth 26a, 26b, 26t, with each sliding tooth movable independent of the other sliding teeth so as to engage between adjacent fixed teeth of the input part 12. Because of the unequal number of teeth on the input and output parts, the twenty sliding teeth 26a, 26b, 26t on the output part 20 will be in various stages of engagement with the teeth 14 of the input part 12.

The invention, of course, may be realized with various combinations of numbers of teeth on the input and output parts. With the particular combination chosen for illustration, which includes thirty six teeth 14 on the input part 12 and twenty teeth 26a, 26b, . . . 26t on the output part 20, the twenty teeth on the output part compose four sets of five sliding teeth 26a, 26b, . . . 26t. At any given time, four of the sliding teeth spaced 90 degrees apart will be in the same state of engagement with the input part teeth 14. Referring by way of example to FIG. 1, in the engagement state represented, the set of teeth 26a, 26f, 26k, and 26p, the set of teeth 26b, 26g, 26l, and 26q, the set of teeth 26c, 26h, 26m, and 26r, the set of teeth 26d, 26i, 26n, and 26s, and the set of teeth 26e, 26j, 26o, and 26t are, respectively, in the same state of engagement. In the condition illustrated in FIG. 1, the teeth 26d, 26i, 26n, and 26s are fully received and engaged in corresponding recesses between saw teeth 14 of the input part 12. This is more apparent from FIG. 2.

Figure 2:
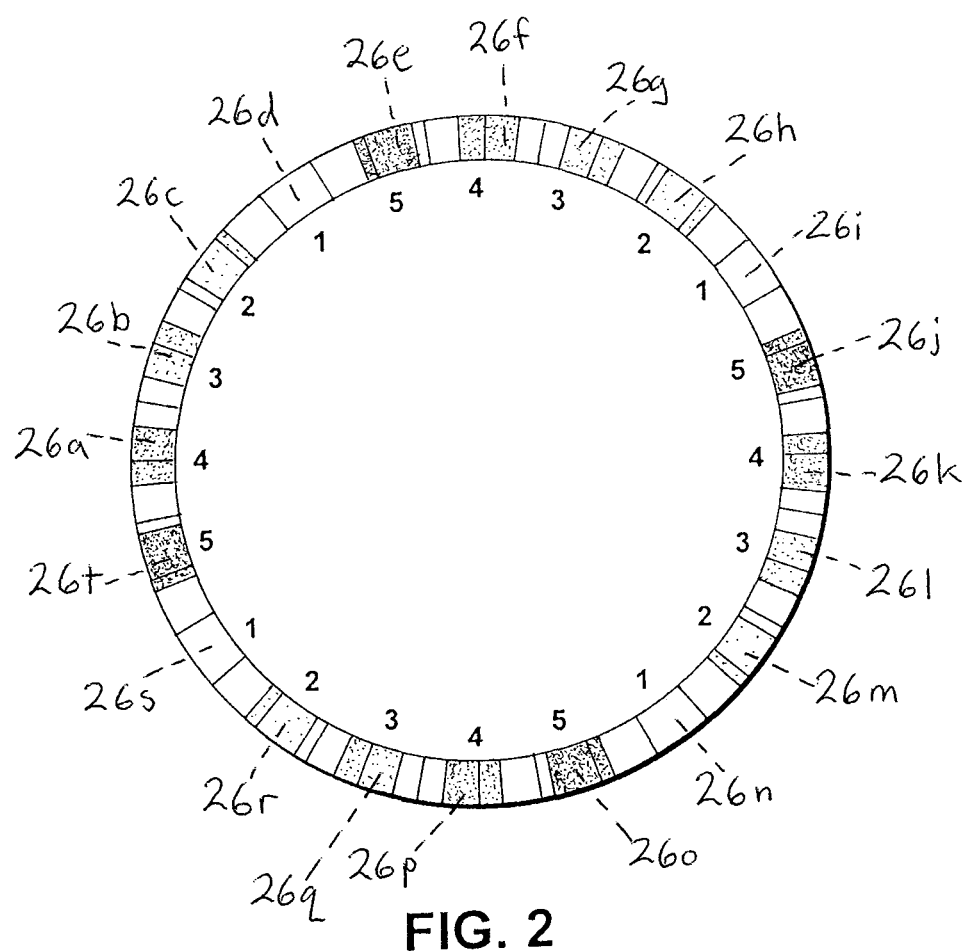
FIG. 2 is a schematic illustration of relative overlap of teeth on the input and output parts of the one-way clutch.

A repeating series of numbers 1, 2, 3, 4, and 5, identifying respective positions, is shown adjacent the sliding saw teeth illustrated in FIG. 1. This repeating series of numbers will be used in conjunction with FIG. 2 to illustrate alignment of each sliding tooth 26a, 26b, . . . 26t with its corresponding recess defined between saw teeth 14. It will be understood that the five teeth in each of the four sets of sliding saw teeth lie within an arc of 72° around the circumference of the axial end 22 of the output part 20, while the thirty six teeth 14 on the input part 12 have a 10° angular pitch (i.e., are disposed at regular spacings of 10°). This is best apparent from consideration of FIG. 2, schematically showing tooth overlap, in conjunction with FIG. 1. A repeating series of position-identifying numbers 1, 2, 3, 4, and 5, corresponding to the same series shown in FIG. 1, appears in FIG. 2. It will be recognized that the twenty blocks with varied shading at the positions 1-5 in FIG. 2 represent the cross sectional areas occupied by the sliding teeth 26a, 26b, . . . 26t, while the thirty-six regularly spaced, unshaded blocks or areas represent the cross sectional areas occupied by the integrally formed or rigidly secured saw teeth 14. If a first tooth 26d of the output part 20, at position "1," is fully engaged or meshed between adjacent teeth 14 of the input part as shown in FIG. 1, then the teeth at every other occurrence of position "1," namely the teeth 26i, 26n, and 26s, will also be fully engaged or meshed between adjacent input part teeth 14. At the same time, each of the immediately adjacent output part teeth at all occurrences of position "2," namely the teeth 26c, 26h, 26m, and 26r, will be 2° ahead, in the input part driving direction 40, of one tip of the input teeth 14, and 8° behind an adjacent tip of the input teeth 14. Similarly, each of the next-adjacent output part teeth at all occurrences of the position "3," namely the teeth 26b, 26g, 26l, and 26q, will be 4° ahead of an input tooth tip and 6° behind an adjacent input tooth tip in the driving direction 40, each of the output part teeth 26a, 26f, 26k, and 26p at positions "4" will be 6° ahead of an input tooth tip and 4° behind an adjacent input tooth tip, and each of the output part teeth 26t, 26e, 26j, and 26o at positions "5" will be 8° ahead of an input tooth tip and 2° behind an adjacent input tooth tip. Accordingly, every time the output part rotates through 2° relative to the input part, due, for example, to friction lining wear, one sliding output tooth in each of the four sets of sliding saw output teeth will be fully engaged or meshed between adjacent teeth 14 of the input part 12, thereby producing a resolution or adjustment increment of 2°. A conventional saw-toothed one-way clutch would need 180 teeth to achieve the same resolution. It would be extremely difficult, if not impossible, to provide that number of teeth in view of size restrictions typically imposed on clutches of this sort.

Thus, a high resolution, saw-toothed, one-way clutch using unequal number of teeth on the input and output parts and independently engaging teeth on one of those parts is provided and readily allows varied degrees of tooth engagement. The sliding or flexible teeth used on one side of the clutch (output or input) allow varied phases of mesh between clutch teeth. The clutch is particularly suitable for use in an automatic slack adjuster to reduce a stroke value below that which is possible with current saw-tooth one-way clutch designs, enabling a variety of applications.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is

1. A one-way clutch for an automatic slack adjuster, comprising:
    a first part rotatable about an axis in both a drive direction and a slip direction opposite to the drive direction,
    a second part that is driven about the axis by the first part when the first part rotates in the drive direction but that is not driven by the first part when the first part rotates in the slip direction, and
    a plurality of movable teeth carried within bores distributed circumferentially about and projecting into an end of one of the parts, the movable teeth being displaceable so as to move within the bores in an axial direction that is parallel to the axis about which the first and second parts are driven relative to both of the parts and engaging corresponding surfaces of teeth that are immovably fixed on the other of the parts.

2. The one-way clutch according to claim 1, wherein the first part is an input part of the clutch.

3. The one-way clutch according to claim 1, wherein the first part is an output part of the clutch.

4. The one-way clutch according to claim 1, wherein the movable teeth have inclined end faces engaging the corresponding surfaces of the teeth that are immovably fixed on the other of the parts.

5. The one-way clutch according to claim 4, wherein the movable teeth are biased to protrude from the bores into engagement with the corresponding surfaces of the teeth that are immovably fixed on the other of the parts.

6. The one-way clutch according to claim 1, wherein, in a selected clutch engagement state, some of said movable teeth have tips fully received in recesses between tips of the teeth that are immovably fixed on the other of the parts and the rest of said movable teeth have tips that are not fully received in said recesses.

7. The one-way clutch according to claim 5, further comprising a resilient element disposed in each of said bores to bias the movable teeth into engagement with the corresponding surfaces of the fixed teeth.

8. The one-way clutch according to claim 1, wherein thirty six of the immovably fixed teeth are provided.

9. The one-way clutch according to claim 1, wherein twenty of the movable teeth are provided.

10. The one-way clutch according to claim 8, wherein twenty of the movable teeth are provided.

11. The one-way clutch according to claim 2, wherein, in a selected clutch engagement state, some of said movable teeth have tips fully received in recesses between tips of the teeth that are immovably fixed on the other of the parts and the rest of said movable teeth have tips that are not fully received in said recesses.

12. The one-way clutch according to claim 3, wherein, in a selected clutch engagement state, some of said movable teeth have tips fully received in recesses between tips of the teeth that are immovably fixed on the other of the parts and the rest of said movable teeth have tips that are not fully received in said recesses.

13. The one-way clutch according to claim 4, wherein, in a selected clutch engagement state, some of said movable teeth have tips fully received in recesses between tips of the teeth that are immovably fixed on the other of the parts and the rest of said movable teeth have tips that are not fully received in said recesses.

14. The one-way clutch according to claim 5, wherein, in a selected clutch engagement state, some of said movable teeth have tips fully received in recesses between tips of the teeth that are immovably fixed on the other of the parts and the rest of said movable teeth have tips that are not fully received in said recesses.

15. An automatic slack adjuster for a vehicle drum brake including a one-way clutch for the slack adjuster, the one-way clutch comprising:
    a first part rotatable about an axis in both a drive direction and a slip direction opposite to the drive direction,
    a second part that is driven about the axis by the first part when the first part rotates in the drive direction but that is not driven by the first part when the first part rotates in the slip direction, and
    a plurality of movable teeth carried within bores distributed circumferentially about and projecting into an end of one of the parts, the movable teeth being displaceable so as to move within the bores in an axial direction that is parallel to the axis about which the first and second parts are driven relative to both of the parts and engaging corresponding surfaces of teeth that are immovably fixed on the other of the parts.

16. The automatic slack adjuster according to claim 15, wherein the first part is an input part of the clutch.

17. The automatic slack adjuster according to claim 15, wherein the first part is an output part of the clutch.

18. The automatic slack adjuster according to claim 15, wherein, in a selected clutch engagement state, some of said movable teeth have tips fully received in recesses between tips of the teeth that are immovably fixed on the other of the parts and the rest of said movable teeth have tips that are not fully received in said recesses.

19. The automatic slack adjuster according to claim 16, wherein, in a selected clutch engagement state, some of said movable teeth have tips fully received in recesses between tips of the teeth that are immovably fixed on the other of the parts and the rest of said movable teeth have tips that are not fully received in said recesses.

20. The automatic slack adjuster according to claim 17, wherein, in a selected clutch engagement state, some of said movable teeth have tips fully received in recesses between tips of the teeth that are immovably fixed on the other of the parts and the rest of said movable teeth have tips that are not fully received in said recesses.

* * * * *